US011699557B2

(12) United States Patent
Nakamura et al.

(10) Patent No.: US 11,699,557 B2
(45) Date of Patent: Jul. 11, 2023

(54) POWER STORAGE MODULE

(71) Applicant: KABUSHIKI KAISHA TOYOTA JIDOSHOKKI, Kariya (JP)

(72) Inventors: Tomohiro Nakamura, Kariya (JP); Yuki Chujo, Kariya (JP); Masahiro Yamada, Kariya (JP); Takayuki Hirose, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 538 days.

(21) Appl. No.: 16/754,528

(22) PCT Filed: Sep. 25, 2018

(86) PCT No.: PCT/JP2018/035450
§ 371 (c)(1),
(2) Date: Apr. 8, 2020

(87) PCT Pub. No.: WO2019/073791
PCT Pub. Date: Apr. 18, 2019

(65) Prior Publication Data
US 2020/0280029 A1 Sep. 3, 2020

(30) Foreign Application Priority Data

Oct. 11, 2017 (JP) ................. 2017-197784

(51) Int. Cl.
*H01G 11/26* (2013.01)
*H01G 11/80* (2013.01)
(Continued)

(52) U.S. Cl.
CPC ............. *H01G 11/26* (2013.01); *H01G 11/80* (2013.01); *H01M 10/0468* (2013.01);
(Continued)

(58) Field of Classification Search
CPC ............. H01M 50/183; H01M 50/543; H01M 10/0468; H01M 2004/029; H01G 11/26; H01G 11/80
See application file for complete search history.

(56) References Cited

U.S. PATENT DOCUMENTS

2003/0072998 A1* 4/2003 Fredriksson ........ H01M 10/044
429/185
2013/0183573 A1 7/2013 Yoshioka et al.

FOREIGN PATENT DOCUMENTS

JP 4248274 A 9/1992
JP 2005-5163 A 1/2005
(Continued)

OTHER PUBLICATIONS

International Preliminary Report on Patentability with translation of Written Opinion of the International Searching Authority for PCT/JP2018/035450 dated Apr. 14, 2020.

*Primary Examiner* — Brian R Ohara
*Assistant Examiner* — Aaron J Salter
(74) *Attorney, Agent, or Firm* — Sughrue Mion, PLLC

(57) ABSTRACT

An electricity-storage module includes an electrode stacked body and a sealing body. A negative terminal electrode is disposed at one end of the electrode stacked body in a stacking direction such that a second surface is an inner side of the electrode stacked body. The sealing body includes first resin portions 21 which are joined to edge portions, and a second resin portion that is joined to the first resin portions 21 so as to surround the first resin portions from an outer side.

12 Claims, 8 Drawing Sheets

(51) Int. Cl.
*H01M 10/04* (2006.01)
*H01M 50/193* (2021.01)
*H01M 50/186* (2021.01)
H01M 4/02 (2006.01)
H01M 50/543 (2021.01)
H01M 50/55 (2021.01)

(52) U.S. Cl.
CPC ....... *H01M 50/186* (2021.01); *H01M 50/193* (2021.01); *H01M 50/543* (2021.01); *H01M 50/55* (2021.01); *H01M 2004/029* (2013.01)

(56) References Cited

FOREIGN PATENT DOCUMENTS

| | | | |
|---|---|---|---|
| JP | 2005-259379 A | 9/2005 | |
| JP | 2011-233298 A | 11/2011 | |
| JP | 2013-168356 A | 8/2013 | |
| JP | 2018-120818 A | 8/2018 | |
| WO | WO-2004051767 A1 * | 6/2004 | ........ H01M 10/0418 |

* cited by examiner

POWER STORAGE MODULE

CROSS REFERENCE TO RELATED APPLICATIONS

This application is a National Stage of International Application No. PCT/JP2018/035450 filed Sep. 25, 2018, claiming priority based on Japanese Patent Application No. 2017-197784, filed Oct. 11, 2017.

TECHNICAL FIELD

An aspect of the present invention relates to an electricity-storage module.

BACKGROUND ART

Patent Literature 1 discloses a bipolar battery. The bipolar battery includes a battery element including a plurality of sheets of bipolar electrodes which are stacked. The bipolar electrode includes a current collector, a positive electrode layer provided on one surface of the current collector, and a negative electrode layer provided on the other surface of the current collector. In addition, the bipolar battery includes a resin group that covers an outer side of the battery element. The resin group is provided to air-tightly maintain the battery element so that an electrolytic solution inside the battery and the like are not leaked to the outside.

CITATION LIST

Patent Literature

Patent Literature 1: Japanese Unexamined Patent Publication No. 2005-005163

SUMMARY OF INVENTION

Technical Problem

In the bipolar battery, for example, when an inner pressure rises, a load is canceled in the bipolar electrode located at an intermediate portion, but the load is not canceled in an outermost bipolar electrode, and thus there is a concern that the current collector and the resin group may be deformed. In this case, a gap occurs between the resin group and the current collector, and thus leakage of the electrolytic solution may occur or breakage of the resin group may occur. Particularly, in a case where the negative electrode layer is located on the outermost portion, and the electrolytic solution is composed of an aqueous alkali solution, leakage of the electrolytic solution from the gap is likely to occur due to a so-called alkali creep phenomenon. In this state, it is preferable to improve reliability by suppressing the leakage or breakage in an electricity-storage module such as the bipolar battery.

Here, an object of an aspect of the invention is to provide an electricity-storage module capable of improving reliability.

Solution to Problem

According to an aspect of the invention, there is provided an electricity-storage module including: a stacked body that includes a plurality of electrodes which are stacked along a first direction; and a sealing body that is provided to the stacked body so as to surround an edge portion of the electrodes. The electrodes include a plurality of bipolar electrodes, a negative terminal electrode, and a positive terminal electrode. The bipolar electrode includes an electrode plate, a positive electrode provided on a first surface of the electrode plate, and a negative electrode provided on a second surface of the electrode plate which is opposite to the first surface. The negative terminal electrode includes the electrode plate and a negative electrode provided on the second surface, and is disposed at one end of the stacked body in the first direction such that the second surface is an inner side of the stacked body. The positive terminal electrode includes the electrode plate and a positive electrode provided on the first surface, and is disposed at the other end of the stacked body in the first direction such that the first surface is an inner side of the stacked body. The sealing body includes a plurality of first sealing portions which are joined to edge portions of the electrodes, and a second sealing portion that is joined to the first sealing portions so as to surround the plurality of first sealing portions from an outer side. The second sealing portion includes a first overlapping portion that is provided on a third sealing portion so as to overlap the third sealing portion as one of the first sealing portions which is joined to an edge portion of the negative terminal electrode at the one end side of the stacked body. The first overlapping portion includes a regulation portion configured to regulate deformation of the third sealing portion along the first direction.

In the electricity-storage module, the sealing body is provided in the stacked body of the electrodes. The sealing body includes the first sealing portions joined to the edge portions of the electrodes, and the second sealing portion provided so as to surround the first sealing portions. On the other hand, the negative terminal electrode including the electrode plate and the negative electrode is disposed at the one end of the stacked body of the electrodes. In addition, the second sealing portion includes the first overlapping portion that is provided on the third sealing portion so as to overlap the third sealing portion that is one of the first sealing portions which is joined to the edge portion of the negative terminal electrode. In addition, the first overlapping portion includes the regulation portion configured to regulate deformation of the third sealing portion. According to this, at least on the negative terminal electrode side, deformation of the sealing body or the like is suppressed, and thus leakage or breakage is suppressed. As a result, according to the electricity-storage module, reliability is improved.

In the electricity-storage module according to the aspect of the invention, the second sealing portion may include a second overlapping portion provided on a fourth sealing portion so as to overlap the fourth sealing portion as one of the first sealing portions which is joined to an edge portion of the positive terminal electrode at the other end side of the stacked body, and the first overlapping portion may include a portion of which the thickness along the first direction is larger than the thickness of the second overlapping portion as the regulation portion. In this case, reliability can be improved with a simple configuration. In the electricity-storage module according to the aspect of the invention, the thickness of the first overlapping portion along the first direction may be equal to or greater than 300 μm and equal to or less than 3 mm.

The electricity-storage module according to the aspect of the invention may further include a constraining member that is disposed at the one end side of the stacked body and is configured to apply a constraining load to the stacked body along the first direction, and the thickness of the regulation portion along the first direction may be two or more times the thickness of the first sealing portion along the first direction in a range in which an outer edge of the regulation portion in the first direction is located on a further inner side of the stacked body in comparison to an outer edge of the constraining member. In this case, reliability can be reliably improved while avoiding an increase in size.

In the electricity-storage module according to the aspect of the invention, the first overlapping portion may include a portion that extends toward the inner side of the stacked body so as to further overlap the electrode plate of the negative terminal electrode as the regulation portion. Even in this case, reliability can be improved with a simple configuration.

According to another aspect of the invention, there is provided an electricity-storage module including: a stacked body that includes a plurality of electrodes which are stacked along a first direction; and a sealing body that is provided to the stacked body so as to surround an edge portion of the electrodes. The electrodes include a plurality of bipolar electrodes, a negative terminal electrode, and a positive terminal electrode. The bipolar electrode includes an electrode plate, a positive electrode provided on a first surface of the electrode plate, and a negative electrode provided on a second surface of the electrode plate which is opposite to the first surface. The negative terminal electrode includes the electrode plate and a negative electrode provided on the second surface, and is disposed at one end of the stacked body in the first direction such that the second surface is an inner side of the stacked body. The positive terminal electrode includes the electrode plate and a positive electrode provided on the first surface, and is disposed at the other end of the stacked body in the first direction such that the first surface is an inner side of the stacked body. The sealing body includes a plurality of first sealing portions which are joined to edge portions of the electrodes, and a second sealing portion that is joined to the first sealing portions so as to surround the plurality of first sealing portions from an outer side. The second sealing portion includes a first overlapping portion that is provided on a third sealing portion so as to overlap the third sealing portion as one of the first sealing portions which is joined to an edge portion of the negative terminal electrode at the one end side of the stacked body. The first overlapping portion includes a first portion having a thickness equal to or larger than the thickness of the second sealing portion on a side surface that intersects the first direction of the stacked body.

In the electricity-storage module, the sealing body is provided to the stacked body of the electrodes. The sealing body includes the first sealing portions joined to the edge portions of the electrodes, and the second sealing portion provided so as to surround the first sealing portions. On the other hand, the negative terminal electrode including the electrode plate and the negative electrode is disposed at the one end of the stacked body of the electrodes. In addition, the second sealing portion includes the first overlapping portion that is provided on the third sealing portion so as to overlap the third sealing portion as one of the first sealing portions which is joined to the edge portion of the negative terminal electrode. In addition, the first overlapping portion includes the first portion having a thickness larger than the thickness of the second sealing portion on a side surface that intersects the first direction of the stacked body. According to this, at least on the negative terminal electrode side, deformation of the sealing body or the like is suppressed, and thus leakage or breakage is suppressed. As a result, according to the electricity-storage module, reliability is improved.

In the electricity-storage module according to the aspect of the invention, the second sealing portion may include a second overlapping portion provided on a fourth sealing portion so as to overlap the fourth sealing portion as one of the first sealing portions which is joined to an edge portion of the positive terminal electrode at the other end side of the stacked body, and the second overlapping portion may include a second portion having a thickness equal to or greater than the thickness of the second sealing portion on a side surface of the stacked body which intersects the first direction. In this case, even in the positive terminal electrode side, deformation of the sealing body or the like is suppressed, and thus leakage or breakage is suppressed. As a result, according to the electricity-storage module, reliability is reliably improved.

Here, in an electricity-storage module, hydrogen is generated on the negative electrode at the first charging due to water in an electrolytic solution. In a case where the negative electrode includes a hydrogen occluding alloy, the hydrogen is occluded to the negative electrode. However, a hydrogen absorbing state is unstable at an inner pressure at the time of typical use, and thus the negative electrode ejects a constant amount of hydrogen. According to this, it enters a state in which hydrogen exists in an inner space. In the electricity-storage module, there is a demand for suppression of transmission of the hydrogen (hydrogen transmission) to the outside.

Here, in the electricity-storage module according to the aspect of the invention, the first sealing portion may include an annular extension portion that extends from an edge portion of the electrode to an outer side of the electrode when viewed from the first direction, and the first portion and the second portion may be provided in an annular shape so as to cover the extension portion when viewed from the first direction.

In this case, in a region corresponding to the extension portion of the first sealing portion, an electrode is not interposed when viewed from the first direction, and it is considered that hydrogen transmission along the first direction is likely to occur. In contrast, in the electricity-storage module, a first portion and a second portion having a relatively large thickness are provided in a region that overlaps the extension portion when viewed from the first direction. Accordingly, hydrogen transmission from the region is suppressed, and thus reliability is more reliably improved.

Advantageous Effects of Invention

According to the aspects of the invention, it is possible to provide an electricity-storage module capable of improving reliability.

DESCRIPTION OF EMBODIMENTS

Figure 1:
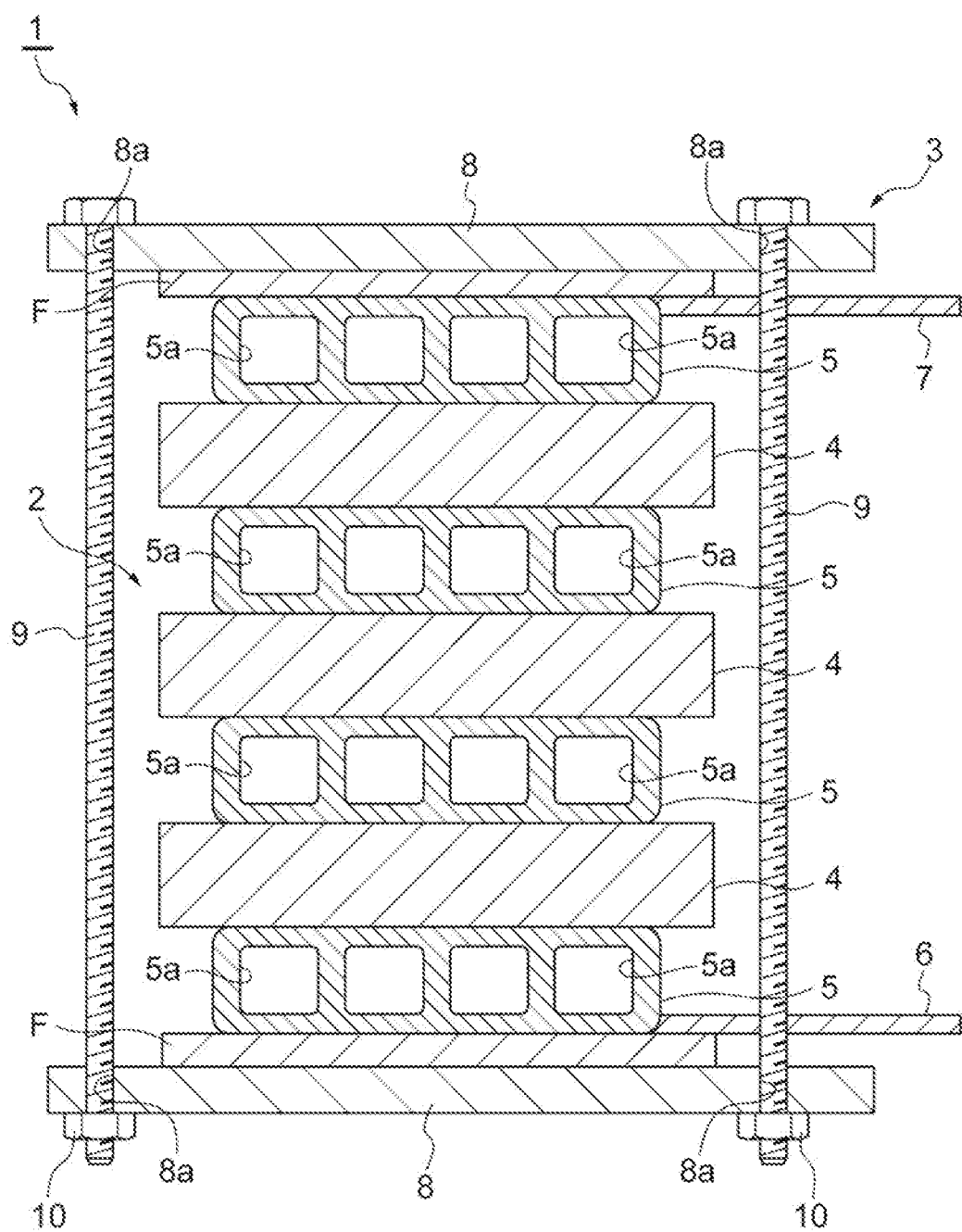
FIG. 1 is a schematic cross-sectional view illustrating an embodiment of an electricity-storage device.

Hereinafter, an embodiment of an electricity-storage module will be described with reference to the drawings. Note that, in description of the drawings, the same reference numeral will be given to the same elements or equivalent elements, and redundant description thereof may be omitted in some cases.

FIG. 1 is a schematic cross-sectional view illustrating an embodiment of an electricity-storage device. As illustrated in FIG. 1, an electricity-storage device 1 may be used, for example, as batteries of various vehicles such as a forklift, a hybrid vehicle, and electric vehicle. The electricity-storage device 1 includes a module stacked body 2 including a plurality of electricity-storage modules 4 which are stacked, and a constraining member 3 that applies a constraining load to the module stacked body 2 in a stacking direction thereof.

The module stacked body 2 includes the plurality of (here, three) electricity-storage modules 4, and a plurality of (here, four) conductive plates 5. Each of the electricity-storage modules 4 is a bipolar battery, and has a rectangular shape when viewed from a stacking direction. For example, the electricity-storage module 4 is a secondary battery such as a nickel-hydrogen secondary battery and a lithium ion secondary battery, or an electric double-layer capacitor. In the following description, the nickel-hydrogen secondary battery will be exemplified.

The electricity-storage modules 4 adjacent to each other in the stacking direction are electrically connected to each other through each of the conductive plates 5. The conductive plate 5 is disposed between the electricity-storage modules 4 adjacent to each other in the stacking direction, and on an outer side of the electricity-storage modules 4 located at stacking ends. A positive electrode terminal 6 is connected to one of the conductive plates 5 disposed on an outer side of the electricity-storage modules 4 located at the stacking ends, and a negative electrode terminal 7 is connected to the other conductive plate 5 between the conductive plates 5 disposed on an outer side of the electricity-storage modules 4 located at the stacking ends. For example, the positive electrode terminal 6 and the negative electrode terminal 7 extend from edge portions of the conductive plates 5 in a direction that intersects the stacking direction. Charging and discharging of the electricity-storage device 1 are carried out by the positive electrode terminal 6 and the negative electrode terminal 7.

A plurality of flow passages 5a through which a coolant such as air is circulated is provided inside the conductive plate 5. For example, the flow passages 5a extend along a direction that intersects (is perpendicular) to the stacking direction and the extension direction of the positive electrode terminal 6 and the negative electrode terminal 7. The conductive plate 5 has a function as a heat dissipation plate for dissipating heat generated in the electricity-storage module 4 by circulating the coolant through the flow passages 5a in addition to a function as a connection member that electrically connects the electricity-storage modules 4 to each other. Note that, in the example illustrated in FIG. 1, an area of the conductive plate 5 when viewed from the stacking direction is smaller than an area of the electricity-storage module 4. However, the area of the conductive plate 5 may be equal to the area of the electricity-storage module 4 or may be greater than the area of the electricity-storage module 4 from the viewpoints of an improvement of heat dissipation.

The constraining member 3 includes a pair of end plates 8 between which the module stacked body 2 is interposed in a stacking direction, and a fastening bolt 9 and a nut 10 which fasten the end plates 8. Each of the end plates 8 is a rectangular metal plate having an area that is slightly larger than the areas of the electricity-storage module 4 and the conductive plate 5 when viewed from the stacking direction. A film F having electrical insulation property is provided on an inner surface of the end plate 8 (a surface on the module stacked body 2 side). The end plate 8 and the conductive plate 5 are insulated by the film F.

An insertion hole 8a is provided in an edge portion of the end plate 8 at a position on an outer side in comparison to the module stacked body 2. The fastening bolt 9 passes through the insertion hole 8a of one of the end plates 8 toward the insertion hole 8a of the other end plate 8, and the nut 10 is screwed to a tip end portion of the fastening bolt 9 that protrudes from the insertion hole 8a of the other end plate 8. According to this, the electricity-storage module 4 and the conductive plate 5 are sandwiched by the end plates 8 to form a unit as the module stacked body 2, and a constraining load is applied to the module stacked body 2 in the stacking direction.

Figure 2:
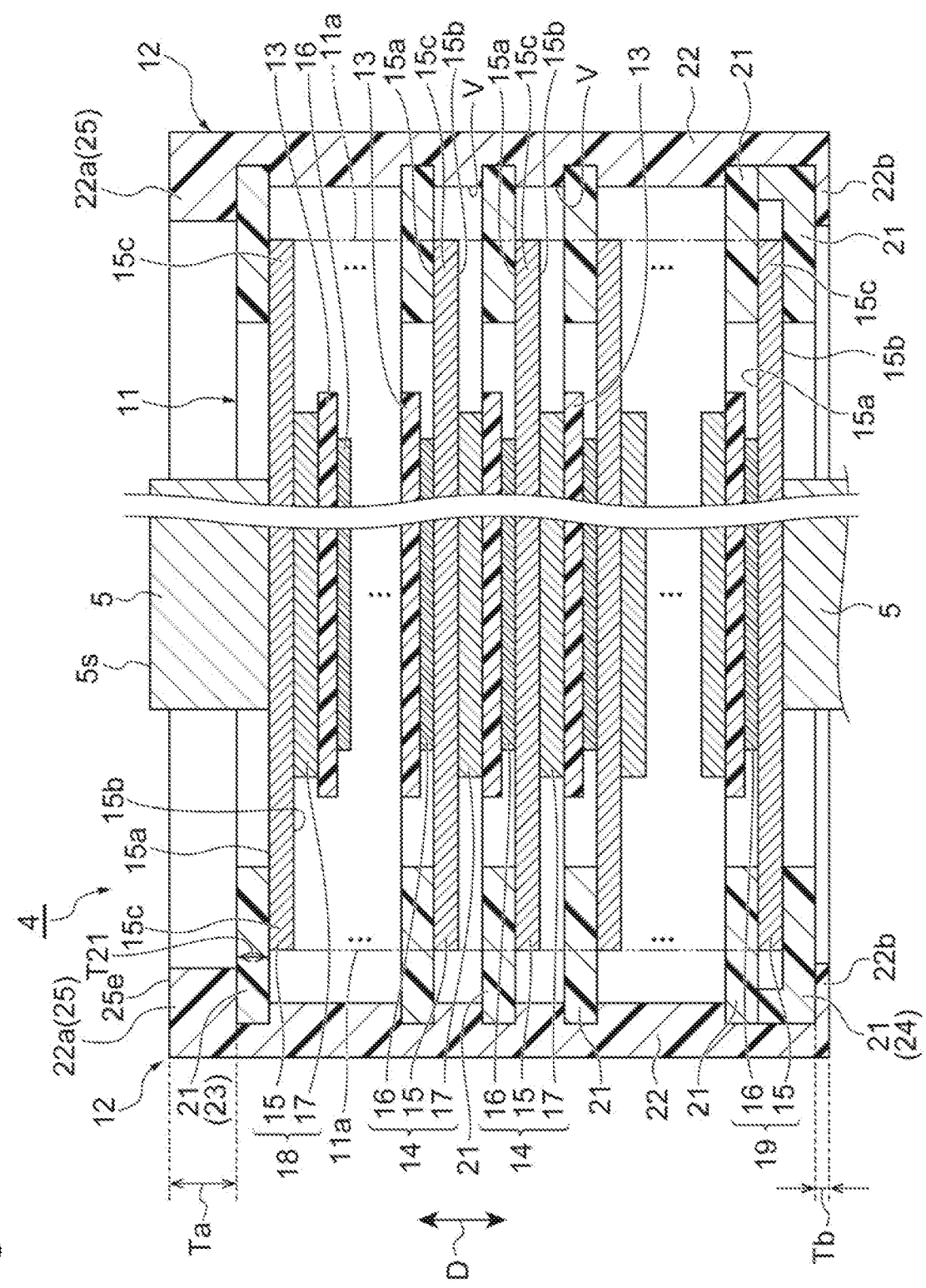
FIG. 2 is a schematic cross-sectional view illustrating an internal configuration of the electricity-storage module illustrated in FIG. 1.

Next, a configuration of the electricity-storage module 4 will be described in detail. FIG. 2 is a schematic cross-sectional view illustrating an internal configuration of the electricity-storage module illustrated in FIG. 1. As illustrated in FIG. 2, the electricity-storage module 4 includes an electrode stacked body (stacked body) 11, and a sealing body 12 that is formed from a resin and seals the electrode stacked body 11. The electrode stacked body 11 includes a plurality of electrodes (a plurality of bipolar electrodes 14, a single negative terminal electrode (electrode) 18, and a single positive terminal electrode 19) which are stacked in a stacking direction D (first direction) through a separator 13. Here, the stacking direction D of the electrode stacked body 11 matches the stacking direction of the module stacked body 2. The electrode stacked body 11 includes a side surface 11a that extends in the stacking direction D.

The bipolar electrode 14 includes an electrode plate 15, a positive electrode 16 provided on a first surface 15a of the electrode plate 15, and a negative electrode 17 that is provided on a second surface 15b of the electrode plate 15 which is opposite to the first surface 15a. The positive electrode 16 is a positive electrode active material layer that is formed by coating a positive electrode active material on the electrode plate 15. The negative electrode 17 is a negative electrode active material layer that is formed by coating a negative electrode active material on the electrode plate 15. In the electrode stacked body 11, the positive electrode 16 of one of the bipolar electrodes 14 faces the negative electrode 17 of another bipolar electrode 14 adjacent in the stacking direction D with the separator 13 interposed therebetween. In the electrode stacked body 11, the negative electrode 17 of one of the bipolar electrodes 14 faces the positive electrode 16 of another bipolar electrode 14 adjacent with the separator 13 interposed therebetween in the stacking direction D.

The negative terminal electrode 18 includes the electrode plate 15 and the negative electrode 17 provided on the second surface 15b of the electrode plate 15. The negative terminal electrode 18 is disposed at one end in the stacking direction D such that the second surface 15b is an inner side (central side with respect to the stacking direction D) of the electrode stacked body 11. The negative electrode 17 of the negative terminal electrode 18 faces the positive electrode 16 of the bipolar electrode 14 at the one end in the stacking direction D through the separator 13. The positive terminal electrode 19 includes the electrode plate 15 and the positive electrode 16 provided on the first surface 15a of the electrode plate 15. The positive terminal electrode 19 is disposed at the other end in the stacking direction D such that the first surface 15a is an inner side of the electrode stacked body 11. The positive electrode 16 of the positive terminal electrode 19 faces the negative electrode 17 of the bipolar electrode 14 at the other end in the stacking direction D through the separator 13.

A conductive plate 5 is in contact with the first surface 15a of the electrode plate 15 of the negative terminal electrode 18. In addition, another conductive plate 5 adjacent to the electricity-storage module 4 is in contact with the second surface 15b of the electrode plate 15 of the positive terminal electrode 19. A constraining load applied from the constraining member 3 is applied to the electrode stacked body 11 from the negative terminal electrode 18 and the positive terminal electrode 19 through the conductive plates 5. That is, the conductive plates 5 function also as a constraining member that applies the constraining load to the electrode stacked body 11 along the stacking direction D.

For example, the electrode plate 15 is formed from a metal such as nickel and a nickel plated steel plate. As an example, the electrode plate 15 is rectangular metal foil formed from nickel. An edge portion 15c of the electrode plate 15 (edge portion of the bipolar electrode 14, the negative terminal electrode 18, and the positive terminal electrode 19) has a rectangular frame shape, and is an uncoated region that is not coated with the positive electrode active material and the negative electrode active material. Examples of the positive electrode active material that constitutes the positive electrode 16 include nickel hydroxide. Examples of the negative electrode active material that constitutes the negative electrode 17 include a hydrogen occluding alloy. In this embodiment, a formation region of the negative electrode 17 on the second surface 15b of the electrode plate 15 is slightly greater than a formation region of the positive electrode 16 on the first surface 15a of the electrode plate 15.

For example, the separator 13 is formed in a sheet shape. Examples of the separator 13 include a porous film formed from a polyolefin-based resin such as polyethylene (PE) and polypropylene (PP), woven or nonwoven fabric formed from polypropylene, methyl cellulose, and the like. In addition, the separator 13 may be reinforced with a vinylidene fluoride resin compound or the like. Note that, the separator 13 is not limited to the sheet shape, and a bag-shaped separator may be used.

The sealing body 12 is formed from an insulating resin in a rectangular tube shape as a whole. The sealing body 12 is provided to the side surface 11a of the electrode stacked body 11 so as to surround the edge portions 15c. The sealing body 12 holds the edge portion 15c at the side surface 11a. The sealing body 12 includes a plurality of first resin portions (a plurality of first sealing portions) 21 which are joined (welded as an example (the same shall apply hereinafter)) to a plurality of the edge portions 15c, and a single second resin portion (second sealing portion) 22 that is joined to the first resin portions 21 so as to surround the first resin portions 21 from an outer side along the side surface 11a.

The first resin portions 21 have a rectangular annular shape and are continuously provided over the entire periphery of the edge portions 15c when viewed from the stacking direction D. Each of the first resin portions 21 is air-tightly joined to the first surface 15a of the electrode plate 15. For example, the first resin portion 21 is joined with ultrasonic waves or heat. The first resin portion 21 is a film having a predetermined thickness (a length in the stacking direction D). An end surface of the electrode plate 15 is exposed from the first resin portion 21. In the first resin portion 21, a part on an inner side is located between the edge portions 15c of the electrode plates 15 adjacent to each other in the stacking direction D, and a part on an outer side extends from the electrode plate 15 to the outside. The first resin portion 21 is buried in the second resin portion 22 at a part on the outer side. The first resin portions 21 adjacent to each other along the stacking direction D are spaced apart from each other.

The second resin portion 22 is provided on an outer side of the electrode stacked body 11 and the first resin portions 21, and constitutes an outer wall (casing) of the electricity-storage module 4. For example, the second resin portion 22 is formed by resin injection molding, and extends over the entire length of the electrode stacked body 11 along the stacking direction D. The second resin portion 22 has a tubular shape (annular shape) that extends with the stacking direction D set as an axial direction. For example, the second resin portion 22 is joined to outer surfaces of the first resin portions 21 with heat at the time of the injection molding.

The second resin portion 22 seals a portion between the bipolar electrodes 14 adjacent to each other along the stacking direction D, a portion between the negative terminal electrode 18 and the bipolar electrode 14 adjacent to each other along the stacking direction D, and a portion between the positive terminal electrode 19 and the bipolar electrode 14 adjacent to each other along the stacking direction D in combination with the first resin portions 21. According to this, an inner space V that is air-tightly partitioned is formed between the bipolar electrodes 14, between the negative terminal electrode 18 and the bipolar electrode 14, and between the positive terminal electrode 19 and the bipolar electrode 14. For example, the inner space V stores an electrolytic solution (not illustrated) composed of an aqueous alkali solution such as an aqueous solution of potassium hydroxide. The separator 13, the positive electrode 16, and the negative electrode 17 are impregnated with the electrolytic solution.

For example, the first resin portions 21 and the second resin portion 22 may be constituted with polypropylene (PP), polyphenylene sulfide (PPS), and modified polyphenylene ether (modified PPE) which are insulating resins.

Figure 3:
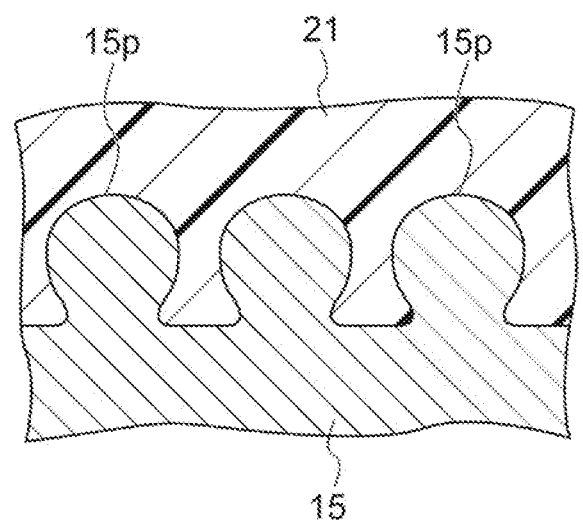
FIG. 3 is a schematic cross-sectional view illustrating a joining interface between an electrode plate and a first resin portion.

FIG. 3 is a schematic cross-sectional view illustrating a joining interface between the electrode plate and the first resin portions. As illustrated in FIG. 3, a surface of the electrode plate 15 is roughened. Here, the entire surface of the electrode plate 15 including the first surface 15a, the second surface 15b, and an end surface as illustrated in FIG. 2 is roughened. For example, the surface of the electrode plate 15 is roughened by forming a plurality of protrusions 15p through electroplating processing. In this manner, in a case where the electrode plate 15 is roughened, at the joining interface between the electrode plate 15 and the first resin portion 21, the first resin portion 21 in a molten state enters a concave portion formed through the roughening, and an anchor effect is exhibited. According to this, a coupling force between the electrode plate 15 and the first resin portion 21 can be improved. At least, in a case where the edge portion 15c in the first surface 15a is roughened, an effect of an improvement in the coupling force is obtained. For example, the protrusions 15p have a shape that expands from a base end side to a tip end side. In this case, a cross-sectional shape between the protrusions 15p adjacent to each other becomes an under-cut shape, and the anchor effect is likely to occur. Note that, FIG. 3 is a schematic view, and the shape, density, and the like of the protrusions 15p are not particularly limited.

Description will be given with reference to FIG. 2 again. As illustrated in FIG. 2, the second resin portion 22 includes a first overlapping portion 22a that is provided on a third resin portion 23 so as to overlap the third resin portion (third sealing portion) 23 as one of the first resin portions 21 which is joined to the edge portion 15c of the negative terminal electrode 18 at one end side of the electrode stacked body 11 in the stacking direction D. The first overlapping portion 22a is formed in a rectangular annular shape and overlaps the entire periphery of an outer edge portion of the third resin portion 23 when viewed from the stacking direction D. The first overlapping portion 22a is air-tightly joined to an outer surface of the third resin portion 23.

In addition, the second resin portion 22 includes a second overlapping portion 22b provided on a fourth resin portion 24 so as to overlap the fourth resin portion (fourth sealing portion) 24 as one of the first resin portions 21 which is joined to the edge portion 15c of the positive terminal electrode 19 at the other end side of the electrode stacked body 11 in the stacking direction D. The second overlapping portion 22b is formed in a rectangular annular shape and overlaps the entire periphery of an outer edge portion of the fourth resin portion 24 when viewed from the stacking direction D. The second overlapping portion 22b is air-tightly joined to an outer surface of the fourth resin portion 24.

The thickness Ta of the first overlapping portion 22a along the stacking direction D is larger than the thickness Tb of the second overlapping portion 22b along the stacking direction D. According to this, the rigidity of the first overlapping portion 22a as a whole becomes greater than the rigidity of the second overlapping portion 22b as a whole, and thus the first overlapping portion 22a is less likely to be relatively deformed. As a result, a regulation portion 25 configured to regulate deformation of the third resin portion 23 along the stacking direction D is constituted in the first overlapping portion 22a. That is, the first overlapping portion 22a includes a portion in which the thickness Ta along the stacking direction D is larger than the thickness Tb of the second overlapping portion 22b as the regulation portion 25. Here, it is assumed that the entirety of the first overlapping portion 22a has the same thickness, and is set as the regulation portion 25.

Here, the thickness of the regulation portion 25 along the stacking direction D (that is, the thickness Ta of the first overlapping portion 22a) is two or more times the thickness T21 of the first resin portion 21 along the stacking direction D. However, an outer edge 25e of the regulation portion 25 in the stacking direction D is located on a further inner side of the electrode stacked body 11 in comparison to an outer edge 5e of the conductive plate 5 in the stacking direction D. That is, the thickness of the regulation portion 25 is two or more times the thickness T21 of the first resin portion 21 in a range in which the outer edge 25e of the regulation portion 25 is located on a further inner side of the electrode stacked body 11 in comparison to the outer edge 5e of the conductive plate 5. Note that, here, the first overlapping portion 22a (that is, the regulation portion 25) does not overlap the electrode plate 15 when viewed from the stacking direction D.

As an example, the thickness Ta is equal to or greater than 300 μm and equal to or less than 3 mm. When the thickness Ta is greater than 3 mm, there is a concern that the thickness Ta may be larger than the thickness of the conductive plate 5 along the stacking direction D. In this case, the following problems may occur. That is, electrical connection between the electricity-storage modules 4 through the conductive plate 5 may be difficult. Heat dissipation (cooling property) of the electricity-storage module 4 using the conductive plate 5 deteriorates. In addition, the size of the electricity-storage module 4 increases. Deterioration is promoted due to concentration of a load to the first resin portion 21 and the second resin portion 22 (a pressure is less likely to be uniformly received on a surface). In other words, when the thickness Ta is set to 3 mm or less, it is possible to suppress occurrence of the problems.

On the other hand, in a case where the thickness Ta is 300 μm or greater (two or more times the thickness Tb), positioning when providing the conductive plate 5 becomes easy. In addition, in this case, a pressure-resistant strength is sufficiently secured, and thus deformation can be reliably regulated.

Next, an example of a method for manufacturing the electricity-storage device 1 will be described. In this method, first, the electricity-storage module 4 is manufactured. A method for manufacturing the electricity-storage module 4 includes a primary molding process, a stacking process, a secondary molding process, and an injection process. In the primary molding process, a predetermined number of the bipolar electrodes 14, the negative terminal electrode 18, and the positive terminal electrode 19 are prepared, and the first resin portions 21 are joined to the first surfaces 15a of the edge portions 15c of the electrode plates 15.

In the stacking process, the bipolar electrodes 14, the negative terminal electrode 18, and the positive terminal electrode 19 are stacked through the separator 13 in such a manner that each of the first resin portions 21 is disposed between the edge portions 15c of the electrode plates 15, thereby forming the electrode stacked body 11. In the secondary molding process, the electrode stacked body 11 is disposed in an injection molding mold (not illustrated), and a molten resin is injected into the mold, thereby forming the second resin portion 22 so as to surround the first resin portions 21. According to this, the sealing body 12 is formed on the side surface 11a of the electrode stacked body 11. In the injection process, after the secondary molding process, an electrolytic solution is injected into the inner space V between the bipolar electrodes 14 and 14. According to this, the electricity-storage module 4 is obtained.

Then, the obtained electricity-storage module 4 and the conductive plates 5 are stacked to form the module stacked body 2, and the electricity-storage device 1 is manufactured through a process of constraining the module stacked body 2 with the constraining member 3, and the like.

Figure 4:
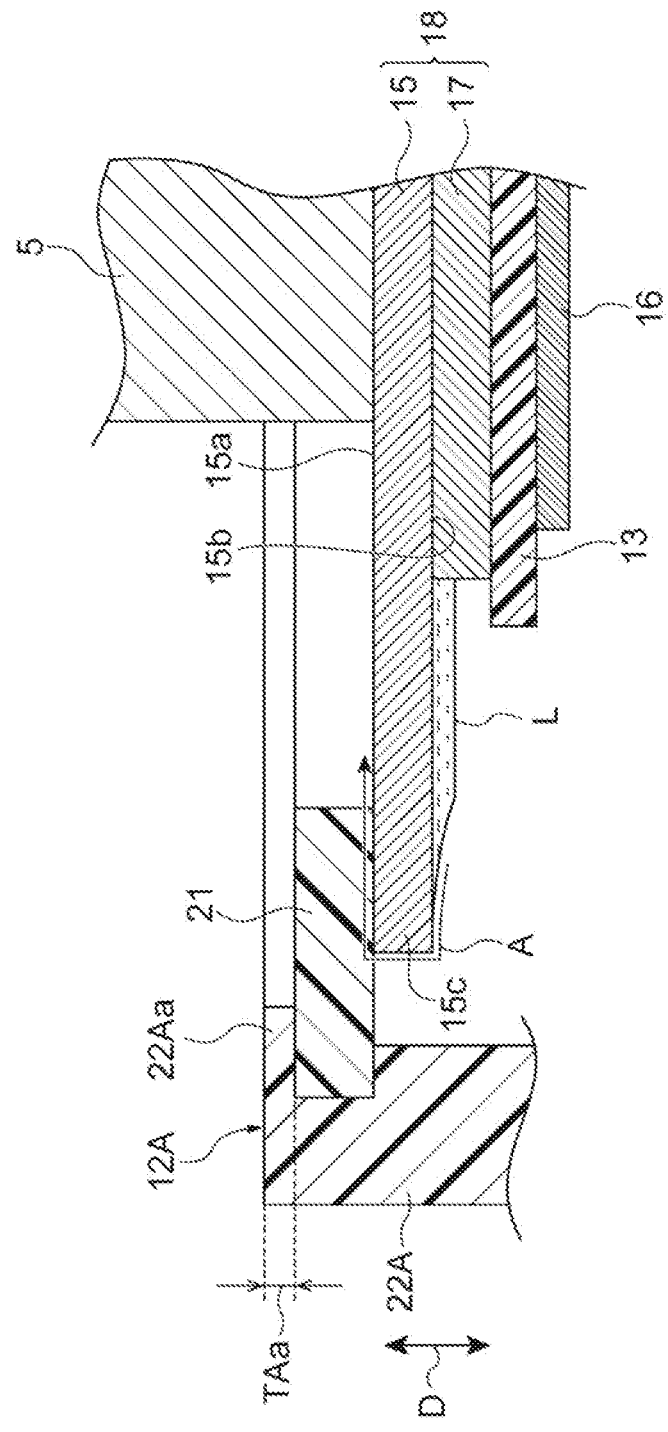
FIG. 4 is an enlarged cross-sectional view of a part of an electricity-storage module according to a comparative example.
Figure 5:
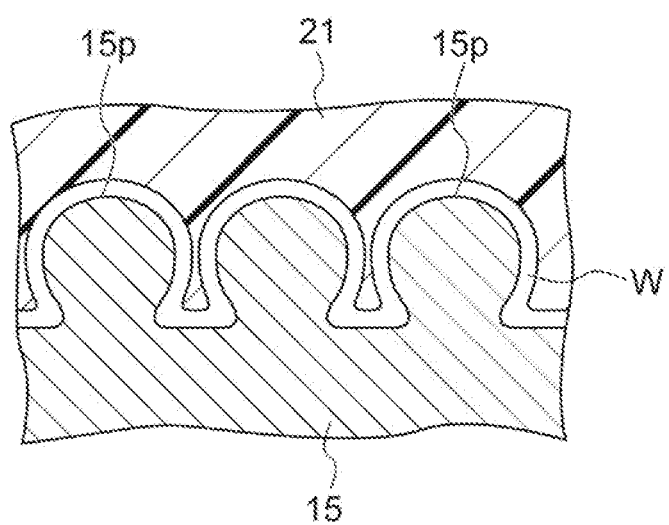
FIG. 5 is a view for describing a problem that occurs in the electricity-storage module of the comparative example.

Next, an operation and an effect of the electricity-storage module 4 will be described. FIG. 4 is an enlarged cross-sectional view of a part of an electricity-storage module according to a comparative example. FIG. 5 is a view for describing a problem that occurs in the electricity-storage module of the comparative example. In an example illustrated in FIG. 4 and FIG. 5, a sealing body 12A is used instead of the sealing body 12. The sealing body 12A includes a second resin portion 22A instead of the second resin portion 22. A first overlapping portion 22Aa of the second resin portion 22A is thinner than the first overlapping portion 22a of the second resin portion 22, and the regulation portion 25 is not provided.

Therefore, when a load is applied to the electrode plate 15 of the negative terminal electrode 18 in accordance with an increase in an inner pressure, there is a concern that the first resin portion 21 joined to the electrode plate 15 may be deformed. In this case, a gap occurs between the first resin portion 21 and the electrode plate 15 (for example, as illustrated in FIG. 5, a gap W is formed between the electrode plate 15 and the first resin portion 21), and thus there is a concern that leakage of an electrolytic solution L may occur through the gap. In addition, when deformation of the first resin portion 21 increases, there is a possibility that breakage of the first resin portion 21 may occur. The leakage of the electrolytic solution L may occur due to an alkali creep phenomenon, particularly, on the negative terminal electrode 18 side.

In the electricity-storage module, due to a so-called alkali creep phenomenon, the electrolytic solution L may be transferred onto the electrode plate 15 of the negative terminal electrode 18, passes through the gap W between the first resin portion 21 of the sealing body 12A and the electrode plate 15, and is seeped to the first surface 15a side of the electrode plate 15. In FIG. 4, a movement route of the electrolytic solution L in the alkali creep phenomenon is indicated by an arrow A. The alkali creep phenomenon may occur during charging and discharging of the electricity-storage device, and during no load due to an electrochemical factor, a fluid phenomenon, or the like. The alkali creep phenomenon occurs due to existence of a negative electrode potential, moisture, and a passage of the electrolytic solution L.

In contrast, according to the electricity-storage module 4, leakage or breakage of the first resin portion 21 caused by the alkali creep phenomenon is suppressed, and thus reliability can be improved. That is, in the electricity-storage module 4, the sealing body 12 is provided in the electrode stacked body 11. The sealing body 12 includes the first resin portions 21 which are joined to the edge portions 15c of the electrodes (the bipolar electrodes 14, the negative terminal electrode 18, and the positive terminal electrode 19), and the second resin portion 22 provided so as to surround the first resin portions 21. On the other hand, the negative terminal electrode 18 is disposed at one end of the electrode stacked body 11. In addition, the second resin portion 22 includes the first overlapping portion 22a provided on the third resin portion 23 so as to overlap the third resin portion 23 as one of the first resin portions 21 which is joined to the edge portion 15c of the negative terminal electrode 18. In addition, the first overlapping portion 22a includes the regulation portion 25 configured to regulate deformation of the third resin portion 23. According to this, at least, deformation of the first resin portions 21 and the like is suppressed on the negative terminal electrode 18 side, and thus the leakage or the breakage is suppressed. Accordingly, according to the electricity-storage module 4, reliability is improved.

In addition, in the electricity-storage module 4, the second resin portion 22 includes the second overlapping portion 22b provided on the fourth resin portion 24 so as to overlap the fourth resin portion 24 as one of the first resin portions 21 which is joined to the edge portion 15c of the positive terminal electrode 19 at the other end side of the electrode stacked body 11. In addition, the first overlapping portion 22a includes a portion in which the thickness Ta along the stacking direction D is larger than the thickness Tb of the second overlapping portion 22b as the regulation portion 25. According to this, reliability can be improved with a simple configuration.

In addition, the electricity-storage module 4 includes the conductive plate 5 that is disposed at the one end side of the electrode stacked body 11 and is configured to apply a constraining load to the electrode stacked body 11 along the stacking direction D. In addition, the thickness Ta of the regulation portion 25 along the stacking direction D is two or more times the thickness T21 of the first resin portion 21 along the stacking direction D in a range in which the outer edge 25e of the regulation portion 25 in the stacking direction D is located on a further inner side of the electrode stacked body 11 in comparison to the outer edge 5e of the conductive plate 5. According to this, it is possible to reliably improve reliability while avoiding an increase in size.

The embodiment relates to an embodiment of the electricity-storage module according to an aspect of the invention. Accordingly, the electricity-storage module according to the aspect of the invention is not limited to the above-described electricity-storage module 4, and can be an electricity-storage module obtained by arbitrarily modifying the electricity-storage module 4 in a range not changing the gist of the appended claims Next, a modification example of the electricity-storage module 4 will be described.

Figure 6:
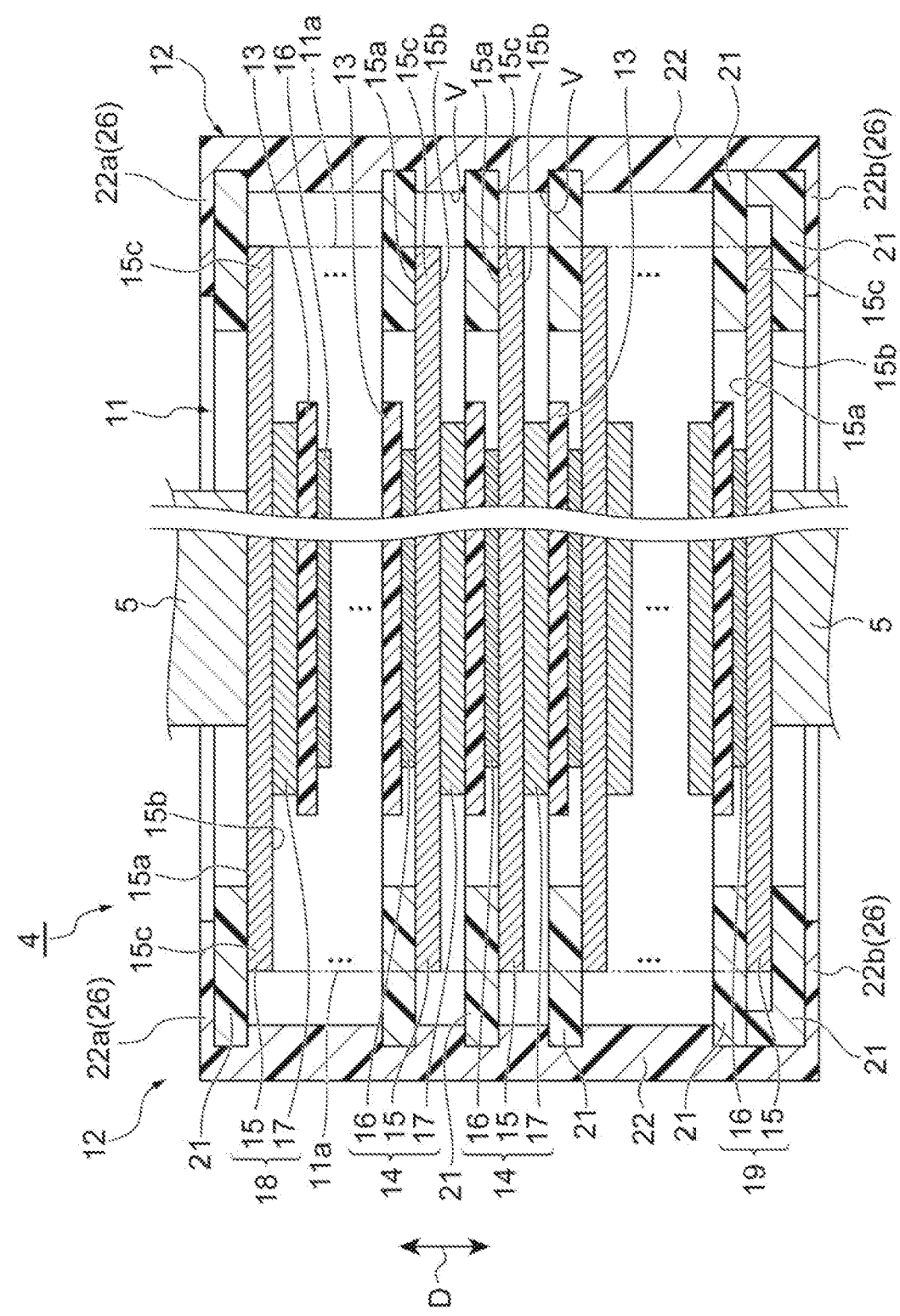
FIG. 6 is a schematic cross-sectional view illustrating an internal configuration of an electricity-storage module according to a modification example.

FIG. 6 is a schematic cross-sectional view illustrating an internal configuration of the electricity-storage module according to this modification example. As illustrated in FIG. 6, here, as a regulation portion 26, the first overlapping portion 22a includes a portion that extends toward an inner side of the electrode stacked body 11 so as to further overlap the electrode plate 15 (edge portion 15c) of the negative terminal electrode 18 in addition to the first resin portion 21 when viewed from the stacking direction D. In addition, as the regulation portion 26, the first overlapping portion 22a includes a portion that extends toward an inner side of the electrode stacked body 11 of the positive terminal electrode 19 so as to further overlap the electrode plate 15 (edge portion 15c) of the positive terminal electrode 19 in addition to the first resin portion 21 when viewed from the stacking direction D. According to the regulation portions 26, deformation of the first resin portions 21 is also regulated with a simple configuration, and thus reliability can be improved. In addition, here, with regard to the second overlapping portion 22b on the positive terminal electrode 19 side, the regulation portion 26 configured to regulate deformation of the first resin portion 21 is provided, and thus reliability can be further improved.

In addition, configurations may be redundantly employed between the electricity-storage module 4 illustrated in FIG. 2, and the electricity-storage module 4 illustrated in FIG. 6. That is, in the electricity-storage module 4 illustrated in FIG. 2, the second overlapping portion 22b may also be provided with the regulation portion 25 as in the first overlapping portion 22a. In this case, the thickness Ta of the first overlapping portion 22a may be substantially the same as the thickness Tb of the second overlapping portion 22b.

In addition, in the electricity-storage module 4 illustrated in FIG. 2, the first overlapping portion 22a and/or the second overlapping portion 22b may extend toward an inner side of the electrode stacked body 11 so as to further overlap the electrode plate 15 while maintaining the thickness. In this case, the first overlapping portion 22a has functions of the regulation portion 25 and the regulation portion 26, and the second overlapping portion 22b has function of the regulation portion 26. In addition, the thickness and an extension length of the second overlapping portion 22b may be set to have functions of the regulation portion 25 and the regulation portion 26.

Figure 7:
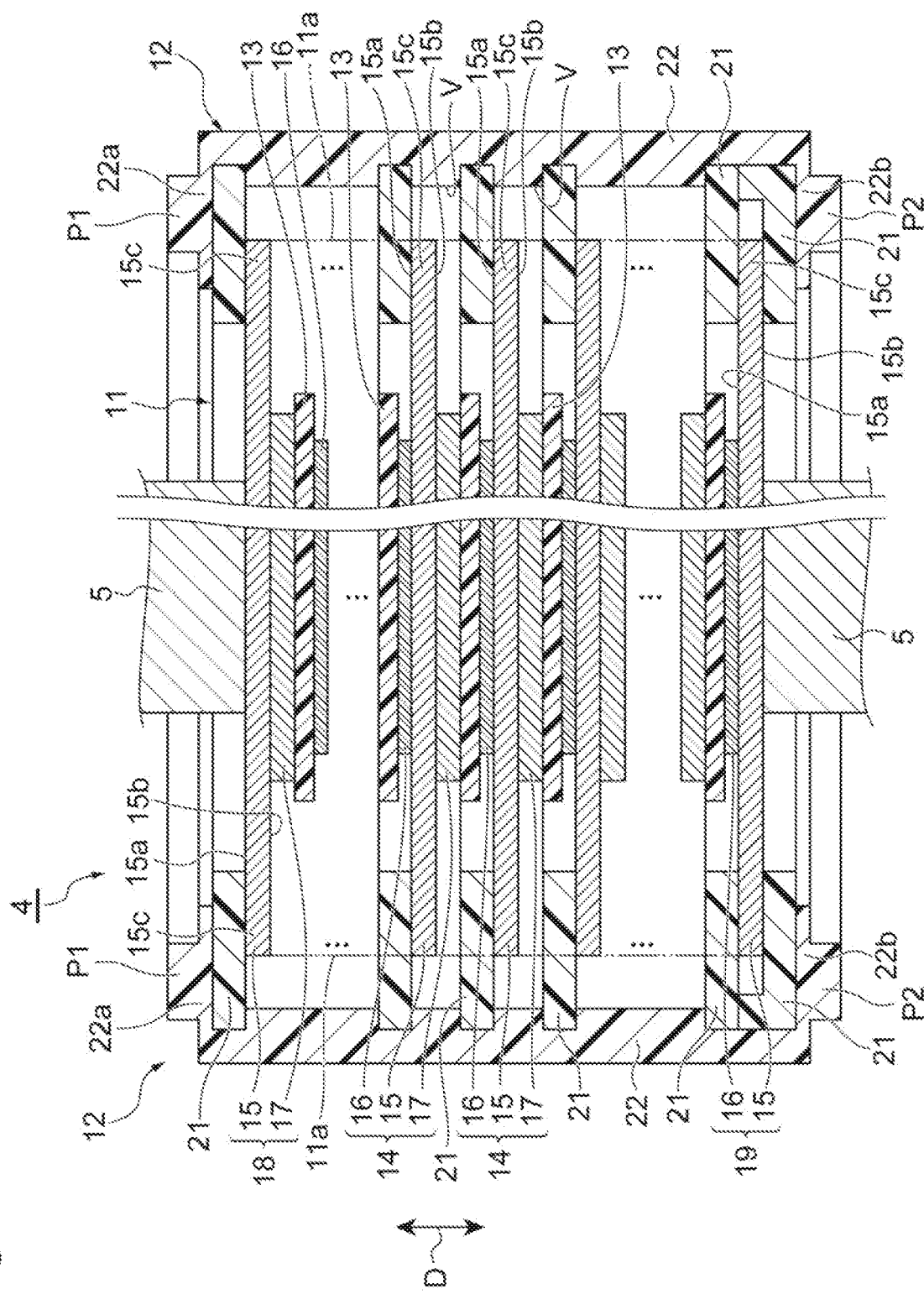
FIG. 7 is a schematic cross-sectional view illustrating an internal configuration of an electricity-storage module according to another modification example.

Here, FIG. 7 is a schematic cross-sectional view illustrating an internal configuration of an electricity-storage module according to another modification example. In the electricity-storage module 4 illustrated in FIG. 7, the first overlapping portion 22a includes a first portion P1. In addition, the second overlapping portion 22b includes a second portion P2. The first portion P1 and the second portion P2 are formed in an annular shape when viewed from the stacking direction D (first direction). The first portion P1 and the second portion P2 are portions having a thickness equal to or larger than the thickness (a dimension in a direction intersecting the stacking direction D) of the second resin portion 22 on the side surface 11a that intersects the stacking direction D of the electrode stacked body 11.

Figure 8:
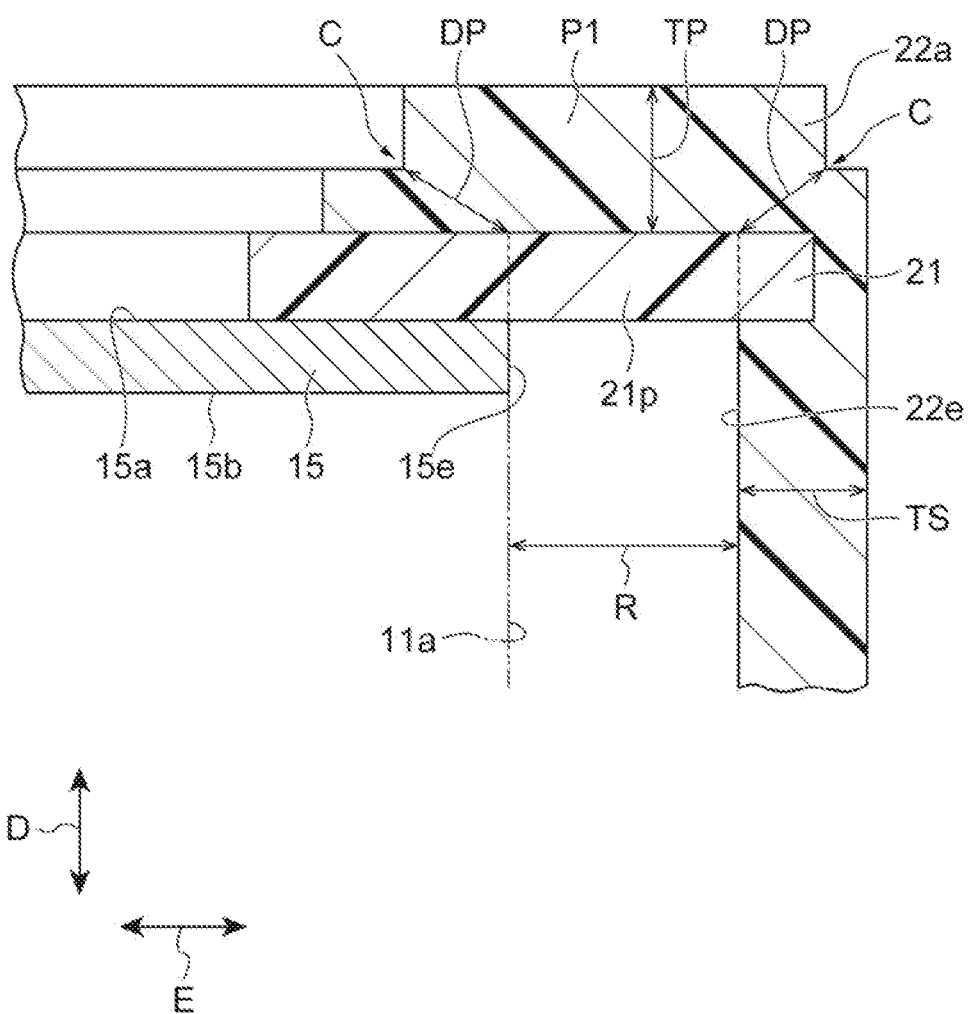
FIG. 8 is an enlarged view of a main portion illustrated in FIG. 7.

FIG. 8 is an enlarged view of a main portion illustrated in FIG. 7. As illustrated in FIG. 8, the first resin portion 21 includes an annular extension portion 21p that extends from the edge portion 15c of the electrode plate 15 of an electrode (here, the negative terminal electrode 18) to an outer side of the electrode when viewed from the stacking direction D. The extension portion 21p is a portion that overlaps a region R between an outer end surface 15e of the electrode plate 15 and an inner side surface 22e of the second resin portion 22 when viewed from the stacking direction D. The inner side surface 22e is a surface that faces the end surface 15e. The electrode plate 15 is not disposed in the region R.

The first portion P1 is provided in an annular shape so as to cover the extension portion 21p when viewed from the stacking direction D. The thickness (a dimension along the stacking direction D) TP of the first portion P1 is equal to or larger than the thickness TS of the second resin portion 22 on the side surface 11a of the electrode stacked body 11. Here, the first portion P1 is provided in a part of the first overlapping portion 22a (may be provided at the entirety thereof). Accordingly, a corner portion C is provided between a base portion of the first overlapping portion 22a and the first portion P1. According to this, a shortest distance from the region R to the outside may be a distance DP from the outer edge portion of the extension portion 21p to the corner portion C. In this case, the distance DP is equal to or larger than the thickness TS. For example, the thickness TP and the distance DP is equal to or greater than 300 μm and equal to or less than 3 mm Note that, FIG. 8 and description of the first portion P1 with reference to FIG. 8 is also true of the second portion P2. The first portion P1 and the second portion P2 can function as the above-described regulation portion.

As described above, in the electricity-storage module 4 according to this example, the sealing body 12 is provided in the electrode stacked body 11. The sealing body 12 includes the first resin portions 21 joined to the edge portions 15c of respective electrodes, and the second resin portion 22 provided so as to surround the first resin portions 21. On the other hand, the negative terminal electrode 18 including the electrode plate 15 and the negative electrode 17 is disposed at one end of the electrode stacked body 11. In addition, the second resin portion 22 includes the first overlapping portion 22a that is provided on the third resin portion 23 so as to overlap the third resin portion 23 as one of the first resin portions 21 which is joined to the edge portion 15c of the negative terminal electrode 18.

In addition, the first overlapping portion 22a includes the first portion P1 having the thickness TP equal to or larger than the thickness TS of the second resin portion 22 on the side surface 11a that intersects the stacking direction D of the electrode stacked body 11. According to this, deformation of the sealing body 12 and the like is suppressed at least on the negative terminal electrode 18 side, and thus leakage or breakage is suppressed. Accordingly, according to the electricity-storage module 4 of this example, reliability is also improved.

In addition, in the electricity-storage module 4 according to this example, the second resin portion 22 includes the second overlapping portion 22b that is provided on the fourth resin portion 24 so as to overlap the fourth resin portion 24 as one of the first resin portions 21 which is joined to the edge portion 15c of the positive terminal electrode 19 on the other end side of the electrode stacked body 11. The second overlapping portion 22b includes the second portion P2 having a thickness equal to or larger than the thickness TS of the second resin portion 22 on the side surface 11a of the electrode stacked body 11 which intersects the stacking direction D. According to this, even on the positive terminal electrode 19 side, deformation of the sealing body 12 or the like is suppressed, and thus leakage or breakage is suppressed. Accordingly, according to the electricity-storage module 4 of this example, reliability is reliably improved.

Here, in an electricity-storage module, hydrogen is generated on the negative electrode at the first charging due to water in an electrolytic solution. In a case where the negative electrode includes a hydrogen occluding alloy, the hydrogen is occluded to the negative electrode. However, a hydrogen absorbing state is unstable at an inner pressure at the time of typical use, and thus the negative electrode ejects a constant amount of hydrogen. According to this, it enters a state in which hydrogen exists in an inner space. In the electricity-storage module, there is a demand for suppression of transmission of the hydrogen (hydrogen transmission) to the outside.

In the electricity-storage module 4 according to this example, the first resin portion 21 includes the annular extension portion 21p that extends from the edge portion 15c of an electrode to an outer side of the electrode when viewed from the stacking direction D. In addition, the first portion P1 and the second portion P2 are provided in an annular shape so as to cover the extension portion 21p when viewed from the stacking direction D.

According to this, in the region R corresponding to the extension portion 21p, an electrode is not interposed when viewed from the stacking direction D, and it is considered that hydrogen transmission along the stacking direction D is likely to occur. In contrast, in the electricity-storage module 4 of this example, the first portion P1 and the second portion P2 having a relatively large thickness are provided in the region R that overlaps the extension portion 21p when viewed from the stacking direction D. Accordingly, hydrogen transmission from the region R is suppressed, and thus reliability is more reliably improved.

INDUSTRIAL APPLICABILITY

It is possible to provide an electricity-storage module capable of improving reliability.

REFERENCE SIGNS LIST

4: electricity-storage module, 5: conductive plate (constraining member), 5e: outer edge, 11: electrode stacked body (stacked body), 12: sealing body, 15: electrode plate, 15*c*: edge portion, 16: positive electrode, 17: negative electrode, 18: negative terminal electrode, 19: positive terminal electrode, 21: first resin portion (first sealing portion), 22: second resin portion (second sealing portion), 22*a*: first overlapping portion, 22*b*: second overlapping portion, 23: third resin portion (third sealing portion), 24: fourth resin portion (fourth sealing portion), 25, 26: regulation portion, Ta, Tb, T21: thickness, D: stacking direction (first direction).

The invention claimed is:

1. An electricity-storage module comprising:
  a stacked body that includes a plurality of electrodes which are stacked along a first direction; and
  a sealing body that is provided to the stacked body so as to surround a plurality of edge portions of the plurality of electrodes,
  wherein the plurality of electrodes include a plurality of bipolar electrodes, a negative terminal electrode, and a positive terminal electrode,
  wherein each of the plurality of bipolar electrodes includes a first electrode plate, a first positive electrode provided on a first surface of the first electrode plate, and a first negative electrode provided on a second surface of the first electrode plate which is opposite to the first surface of the first electrode plate,
  wherein the negative terminal electrode includes a second electrode plate and a second negative electrode provided on a second surface of the second electrode plate, and is disposed at one end of the stacked body in the first direction such that the second surface of the second electrode plate is a first inner side of the stacked body,
  wherein the positive terminal electrode includes a third electrode plate and a second positive electrode provided on a first surface of the third electrode plate, and is disposed at an other end of the stacked body in the first direction such that the first surface of the third electrode plate is a second inner side of the stacked body,
  wherein the sealing body includes a plurality of first sealing portions which are joined to the plurality of edge portions of the plurality of electrodes, and a second sealing portion that is joined to each of the plurality of first sealing portions so as to surround the plurality of first sealing portions from an outer side,
  wherein the second sealing portion includes a first overlapping portion that is provided on a third sealing portion of the plurality of first sealing portions at the one end of the stacked body so as to overlap the third sealing portion which is joined to an edge portion of the negative terminal electrode, the edge portion of the negative terminal electrode being of the plurality of edge portions, and
  wherein the first overlapping portion includes a regulation portion configured to regulate deformation of the third sealing portion along the first direction;
  wherein the third sealing portion includes a first surface of the third sealing portion and a second surface of the third sealing portion, the second surface of the third sealing portion being opposite to the first surface of the third sealing portion in the first direction;
  wherein the second surface of the third sealing portion connects to a first surface of the second electrode plate, the first surface of the second electrode plate being opposite to the second surface of the second electrode plate in the first direction;
  wherein at least some of the first surface of third sealing portion is welded to the first overlapping portion.

2. The electricity-storage module according to claim 1,
  wherein the second sealing portion includes a second overlapping portion provided on a fourth sealing portion of the plurality of first sealing portions so as to overlap the fourth sealing portion which is joined to an edge portion of the positive terminal electrode at the other end of the stacked body, the edge portion of the positive terminal electrode being of the plurality of edge portions, and
  wherein the first overlapping portion includes a portion of which the thickness along the first direction is larger than the thickness of the second overlapping portion as the regulation portion.

3. The electricity-storage module according to claim 1,
  wherein the thickness of the first overlapping portion along the first direction is equal to or greater than 300 μm and equal to or less than 3 mm.

4. The electricity-storage module according to claim 1, further comprising:
  a constraining member including a pair of end plates between which the stacked body is interposed in the first direction and, is configured to apply a constraining load to the stacked body along the first direction,
  wherein the thickness of the regulation portion along the first direction is two or more times the thickness of each of the plurality of first sealing portions along the first direction in a range in which an outer edge of the regulation portion in the first direction is located on a further inner side of the stacked body in comparison to an outer edge of the constraining member.

5. The electricity-storage module according to claim 1,
  wherein the first overlapping portion includes a portion that extends toward the first inner side of the stacked body so as to further overlap the second electrode plate as the regulation portion.

6. The electricity-storage module according to claim 1,
  wherein the first overlapping portion includes a first portion having a thickness equal to or larger than the thickness of the second sealing portion on a side surface that intersects the first direction of the stacked body as the regulation portion.

7. The electricity-storage module according to claim 6,
  wherein the second sealing portion includes a second overlapping portion provided on a fourth sealing portion of the plurality of first sealing portions so as to overlap the fourth sealing portion which is joined to an edge portion of the positive terminal electrode at the other end of the stacked body, the edge portion of the positive terminal electrode being of the plurality of edge portions, and
  wherein the second overlapping portion includes a second portion having a thickness equal to or greater than the thickness of the second sealing portion on a side surface of the stacked body which intersects the first direction.

8. The electricity-storage module according to claim 7,
  wherein each of the plurality of first sealing portions includes an annular extension portion that extends respectively from each of the plurality of edge portions of the plurality of electrodes to an outer side of the plurality of electrodes when viewed from the first direction, and
  wherein the first portion and the second portion are provided in an annular shape so as to cover the extension portion when viewed from the first direction.

9. The electricity-storage module according to claim 1, wherein the regulation portion in the first direction is of larger thickness than the third sealing portion in the first direction.

10. The electricity-storage module according to claim 9, wherein the regulation portion in the first direction is of larger thickness than the third sealing portion in the first direction by a factor of at least two.

11. The electricity-storage module according to claim 1, wherein the plurality of first sealing portions and the second sealing portion is made of a non-electrically conductive material.

12. The electricity-storage module according to claim 11, wherein the non-electrically conductive material is resin.

* * * * *